May 18, 1937.     T. E. NELSON     2,080,670
OIL SEAL
Filed March 4, 1936

INVENTOR.
Thomas Edward Nelson
BY
ATTORNEY.

Patented May 18, 1937

2,080,670

UNITED STATES PATENT OFFICE 2,080,670

OIL SEAL

Thomas Edward Nelson, Pontiac, Mich.

Application March 4, 1936, Serial No. 67,008

2 Claims. (Cl. 288—1)

This invention relates to oil seals and the object of the invention is to provide an oil seal arranged to prevent leakage of oil about a rotating member.

Another object of the invention is to provide an oil seal comprising a retainer and an inner cup, the inner cup having a flange provided with a waved or indented edge against which an annular member is positioned and a flexible washer being engaged between the annular member and the retainer.

A further object of the invention is to provide an oil seal of the character described in which the flexible packing or washer is provided with a portion fitting about a shaft and a coiled spring is seated on said portion and urges it into engagement with the shaft.

Another object of the invention is to provide an inner cup having a wavy edge and an annular member supported by said wavy edge so that a flexible washer may be firmly engaged between said annular member and the retainer.

These objects and the several novel features of the invention are hereinafter more fully described and claimed and the preferred form of construction by which these objects are attained is shown in the accompanying drawing in which—

Figure 2:
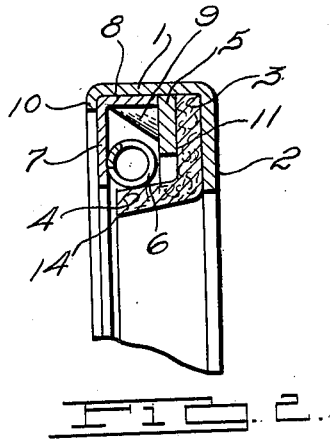
Fig. 2 is an enlarged section through the oil seal.
Figure 3:
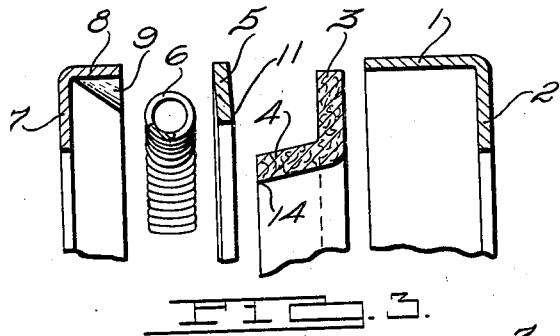
Fig. 3 is a sectional view illustrating the assembly of the parts.
Figure 4:
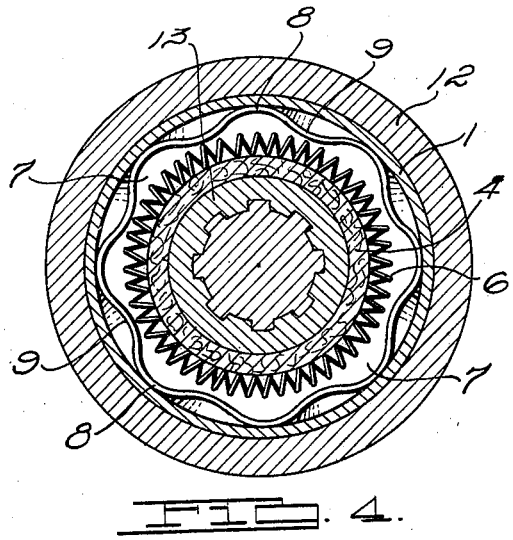
Fig. 4 is an enlarged section taken on line 4—4 of Fig. 1.

The parts of the oil seal are shown more particularly in Fig. 3 and comprise an outer retainer member 1 having an inwardly extending flange 2. A washer 3 is provided of leather, cork, asbestos, or flexible laminated material and this washer 3 is provided with an angularly extending inner portion 4 as shown. This washer is fitted into the retainer 1 against the flange 2 as shown in Fig. 2 and a metal ring or annular member 5 is inserted in the retainer 1 against the flexible washer 3. This annular member 5 is formed at a slight angle as shown and after the ring has been mounted in place, as shown in Fig. 2, a coiled spring 6 is positioned over the portion 4 of the flexible washer. A cup 7 is then inserted in the retainer 1 and this cup 7 is provided with a cylindrical flange 8 having waves or indentations 9 formed therein. These waves extend inwardly from the outer diameter of the cup at an angle as shown and are spaced equidistantly about the outer flange 8 as shown in Fig. 4. This waved edge is positioned in engagement with the annular member 5 as shown in Fig. 2 and firmly supports and presses the annular member 5 toward the flange 2 of the retainer 1. When the parts have been assembled in position, as shown in Fig. 2, the edge 10 of the retainer is inturned to hold the parts in assembled relation and by means of this inturned edge the wavy edge 9 of the cup 7 presses the annular member 5 into firm engagement with the washer 3 and grips the same between the member 5 and the flange 2 of the retainer 1. It is to be noted that this wavy edge supports the annular member 5 in a vertical plane and as the member 5 is formed at a slight angle to a vertical plane there is a spring tendency in said member to engage the flexible washer 3 firmly at the edge 11. While the annular member 5 is formed at a slight angle, the pressure of the wavy edge 9 applied to said member brings it into a vertical plane to firmly grip the washer 3 so that in assembly the member 5 is changed from a slight angle into a vertical plane.

Figure 1:
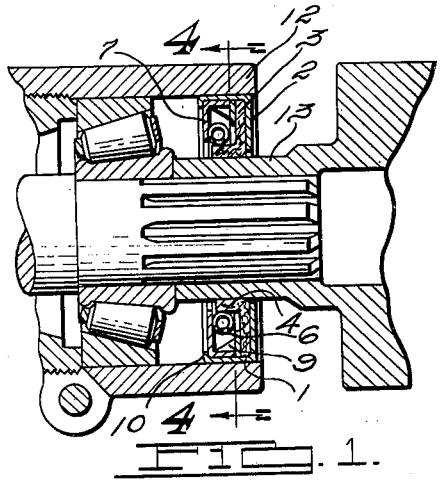
Fig. 1 is a section through the oil seal mounted in operating position.

With the device assembled as shown in Fig. 2 it is ready for use. The oil seal is mounted in a supporting member 12 of any desired nature as shown in Fig. 1. The rotating member 13 is inserted through the central aperture in the oil seal and the cylindrical surface of the member 13 engages the portion 4 of the resilient washer causing the spring 6 to expand slightly as the portion 4 is expanded by the rotating member. When properly positioned as shown in Fig. 1, the portion 4 is held firmly against the rotating member 13 so that an efficient oil seal is provided and as the sharp angular edge 14 of the portion 4 is held in engagement with the rotating surface by the spring 6 the oil is prevented from leaking outwardly along the surface of the rotating member. At the same time, the undulating or wave flange of the cup 7 holds the portion 3 of the flexible washer firmly in position in the retainer.

Figure 5:
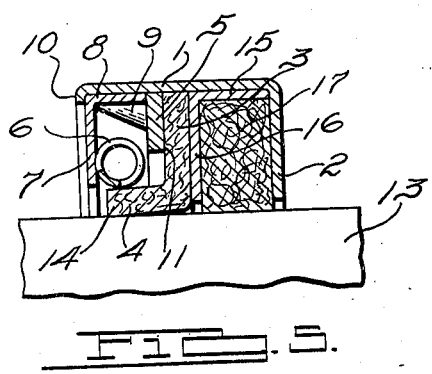
Fig. 5 is an enlarged section through a modified form of the oil seal.

An alternative form of the device is shown in Fig. 5 in which the same members are utilized with the exception that a member 15 is provided having an inwardly extending flange 16 and a packing 17 is held between the flange 16 and the flange 2 of the member 1, which in this case is widened to accommodate both packing members 3 and 17. In this form of the device, the wave flange acts in the same capacity in holding the ring 5 in tight engagement with the washer 3 and the washer is gripped between the ring 5 and the flange 16 of the member 15. This provides a double packing for the rotating member 13 as will be readily understood from Fig. 5.

From the foregoing description it becomes evident that the device is very simple and efficient in operation, is composed of few parts and is of consequent low manufacturing cost, will maintain an effective seal about a cylindrical rotating member and provides a device which accomplishes the objects described.

Having thus fully described my invention, its utility and mode of operation, what I claim and desire to secure by Letters Patent of the United States is—

1. In an oil seal, a retainer having a flange, a resilient washer positioned in the retainer against the flange, an annular member positioned against the resilient washer, a cup having a cylindrical flange, said cylindrical flange having radially depressed portions extending radially at an angle to the axis of the cylindrical flange, the depressions being deepest at the outer edge of the cylindrical flange and fading out at the inner edge and said outer edge engaging against the annular member, the retainer fitting over the cup, annular member and washer and securing the same together, the flexible washer having an angularly extending portion and a coiled spring positioned within the cup and engaging about said angularly extending portion of the flexible washer.

2. In an oil seal, a retainer having a flange, a resilient washer positioned in the retainer against the flange, an annular member positioned against the resilient washer, a cup having a cylindrical flange, said cylindrical flange having radially depressed portions extending radially at an angle to the axis of the cylindrical flange, the depressions being deepest at the outer edge of the cylindrical flange and fading out at the inner edge and said outer edge engaging against the annular member, the retainer fitting over the cup, annular member and washer and securing the same together, the flexible washer having an angularly extending portion and a coiled spring positioned within the cup and engaging about said angularly extending portion of the flexible washer, the sloping depressions in the cylindrical flange providing a space in which the coiled spring may expand within the cup.

THOMAS EDWARD NELSON.